Feb. 6, 1951 S. B. WILLIAMS 2,540,226

ELECTROMECHANICAL STORAGE MECHANISM

Filed Dec. 20, 1947 11 Sheets-Sheet 1

Samuel B. Williams

INVENTOR

Feb. 6, 1951 S. B. WILLIAMS 2,540,226

ELECTROMECHANICAL STORAGE MECHANISM

Filed Dec. 20, 1947 11 Sheets-Sheet 2

Samuel B. Williams

INVENTOR

Feb. 6, 1951 S. B. WILLIAMS 2,540,226

ELECTROMECHANICAL STORAGE MECHANISM

Filed Dec. 20, 1947 11 Sheets-Sheet 3

Samuel B. Williams

INVENTOR

ELECTROMECHANICAL STORAGE MECHANISM

Filed Dec. 20, 1947 11 Sheets-Sheet 4

Samuel B. Williams

INVENTOR

ELECTROMECHANICAL STORAGE MECHANISM

Samuel B. Williams

INVENTOR

Samuel B. Williams
INVENTOR

Feb. 6, 1951 S. B. WILLIAMS 2,540,226

ELECTROMECHANICAL STORAGE MECHANISM

Filed Dec. 20, 1947 11 Sheets-Sheet 7

Samuel B. Williams
INVENTOR

Samuel B. Williams
INVENTOR

Feb. 6, 1951 S. B. WILLIAMS 2,540,226

ELECTROMECHANICAL STORAGE MECHANISM

Filed Dec. 20, 1947 11 Sheets-Sheet 9

Samuel B. Williams
INVENTOR

Feb. 6, 1951 S. B. WILLIAMS 2,540,226

ELECTROMECHANICAL STORAGE MECHANISM

Filed Dec. 20, 1947 11 Sheets-Sheet 10

Samuel B. Williams

INVENTOR

Feb. 6, 1951 S. B. WILLIAMS 2,540,226

ELECTROMECHANICAL STORAGE MECHANISM

Filed Dec. 20, 1947 11 Sheets-Sheet 11

Samuel B. Williams
INVENTOR

Patented Feb. 6, 1951

2,540,226

UNITED STATES PATENT OFFICE 2,540,226

ELECTROMECHANICAL STORAGE MECHANISM

Samuel B. Williams, Brooklyn, N. Y., assignor to The National Cash Register Company, Dayton, Ohio, a corporation of Maryland Application December 20, 1947, Serial No. 792,984

15 Claims. (Cl. 235—61.6)

This invention relates to means for storing data in calculating and computing systems, but is not necessarily limited to such systems and may find use in any electrical system which requires storage of coded data of any character whatsoever.

The invention is particularly useful when the keyboard or other means used for introducing data and withdrawing results is remotely located from the calculating and computing equipment because of its adaptation to remote control by electrical means.

In computing systems it is frequently necessary to retain the result of an arithmetical calculation while other results are obtained so that the first result may later be combined arithmetically with the later results. Storage means for such purposes are not new as illustrated in the Hollerith counter, the mechanical counters in business machines or in relays. The device which is the subject of this invention is electrically controlled, mechanically operated, and is self-contained. It does not require the power driven shaft of either the Hollerith or mechanical counters or the locking circuit of the relays.

The storage mechanism described herein consists of several registers, any one of which may be brought under the control of common apparatus which forms the connecting link between a given register and the calculating system. The data to be stored is in coded form but the physical grouping of the various register elements or storage devices is not directly affected by the code. This grouping is obtained through the electrical circuits involving contacts operated by the common control apparatus which relates them electrically to the code. Each register element or storage device represents a unit of the code so that, for example, a five unit code relates a certain five elements of each register with the corresponding five contact sets of the common control apparatus.

One of the features believed to be novel resides in controlling the mechanical operation of a storage register from electrically controlled mechanism common to several such registers and the storage of such registration by wholly mechanical means.

Still another feature is the reduction of electrical contacts to a minimum whereby one set of contacts is mechanically controlled by any given one of the several registers. This reduces the amount of wiring required to connect the registers to the general control circuit.

Still another feature resides in the step by step method of transferring data from one register to another which, of course, may be applied when such transfer is made from a register to the calculator or to the printer in a complete computing system. Each step in the operation must be fully and accurately completed before the next step is started. This method of operation provides for stopping the operation of a complete system when a failure occurs and facilitates a search for the cause thereof.

The above-mentioned and other features and objects of this invention and the manner of obtaining them will become more apparent and the invention itself will be best understood, by reference to the following description of the invention taken in conjunction with the accompanying drawings, wherein:

Figs. 1*a* and 1*b* show a side view of the storage mechanism. Fig. 1*a* shows the common mechanism mounted above Fig. 1*b* which shows two registers.

Figs. 2*a* and 2*b* show a top view of the storage mechanism. Fig. 2*a* shows the common mechanism mounted above Fig. 2*b* which shows three register elements with cutaways for showing more clearly the operation of various parts of the device.

Fig. 3 shows a front view of three register elements of two registers with various sections as indicated in Fig. 1.

Figs. 4*a* and 4*b* show the storage mechanism in perspective. Fig. 4*a* shows the common mechanism mounted above Fig. 4*b* which shows two register elements of one register together with the common control apparatus and contacts at the top.

Figs. 5*a*, 5*b* and 5*c* when placed in order, side by side, show a circuit in schematic form to illustrate the transfer of a coded digit stored in one register to another register in the same storage mechanism.

Fig. 6*a* shows an exploded view of the camming arrangement for displacing a register element.

Fig. 6*b* shows an exploded view of the cam and strap for indicating to the common equipment, the condition of a register element.

Fig. 6*c* shows an exploded view of the common cam and contacts controlled by the strap.

One of the essential requirements of a remotely controlled device is accuracy. Electrical signals originated at the operating point must be faithfully and accurately reproduced at the receiving point. There are in general two methods of transmitting signals electrically and recording them accurately. An electric circuit may be closed to operate a relay or a magnet to record one of two signals and the receiving device is either operated or not operated to record the signal. This method is not as reliable as one in which one of two devices is operated to record the signal because the single recording device may fail to operate when the circuit is closed and thus cause an error. With the second method, a device is always operated for recording and circuit means can be provided to produce a return or acknowledgment signal to indicate that the record has been accurately completed. The latter method is employed in the operation of the storage mechanism described.

A register element or storage device consists of a bar adapted to be displaced from its normal position by the coordinate operations of two shafts, one called a code shaft or selector member, being common to corresponding elements of all registers and the other called a register selector or operating shaft being common to all the elements of one register. The code shaft carries camming means adapted to operate the corresponding element of all registers and when a register shaft is operated the particular register element may be displaced. The shafts are operated by electric magnets, and contact springs are adapted to be opened or closed, thus indicating the normal or displaced position of a register element.

A test is made of each register element to detect its position as normal or displaced. Each register element is provided with a lug which, in the normal position of the element, prevents a cam, loosely fastened to a register shaft, from engaging a transverse strap common to corresponding elements of all registers. These straps are adapted to be moved by the operation of a common magnet in such a manner as to operate contact springs individual to the straps and forming a part of the common equipment. The contact springs thus may detect the condition of the register elements and indicate by their operated or released condition when an element is in its normal or displaced position.

The storage mechanism employs two distinct operating principles, one for introducing data in coded form into a given register. The other principle provides for detecting the data stored in a given register and may be used for withdrawing the coded data. The mechanism employs one set of shafts and cams for introducing the data, and is arranged to destroy a previous registration or to alter it to represent the newly introduced data. The device may employ more than one set of shafts, cams, straps, and contacts for detecting the registered data. One such set is employed to check the registration of the data for accuracy and one or more such sets may be employed to read out the data from a given register.

GENERAL DESCRIPTION

When it is desirable to store data or symbols in such a manner that the data or symbols may be referred to or withdrawn completely from such storage, the data is generally in coded form. The code used should provide for a ready means for checking the accuracy of information stored or transferred. That is to say, the storage device should represent accurately the code placed therein. The method used herein for illustration requires that each character or symbol of the data be represented by a combination of units less in number than the total number of units from which the code is derived. Each of the units is represented in the storage device by a register element, electrical contacts being operated corresponding to each element. A circuit is closed to signal that exactly the required ones of the units or elements are operated.

When this principle is applied in the serial or step by step operation of an electrical system, the highest degree of accuracy is assured, because a dishonest but valid representation can be obtained only when a cross occurs between the individual paths for operating two of the means and the valid means fails to operate due to an open wire or to mechanical failure.

As previously stated, the various register elements may be similar and may be divided into groups according to the number of units in the code, this division being a matter of circuit connections. In a register having 60 register elements, a 5 unit code provides for a storage of 12 symbols, whereas a 6 unit code provides for a storage of 10 symbols.

In order to illustrate more fully the application of this basic principle of operation, the ten digital values of a decimal number may be represented in a five unit code as follows where each digital value is represented by two units of the code

*Code table*

| Digital Value | Code Units | | | | |
|---|---|---|---|---|---|
| | *a* | *b* | *c* | *d* | *e* |
| 0 | + | + | − | − | − |
| 1 | + | − | + | − | − |
| 2 | + | − | − | + | − |
| 3 | + | − | − | − | + |
| 4 | − | + | + | − | − |
| 5 | − | + | − | + | − |
| 6 | − | + | − | − | + |
| 7 | − | − | + | + | − |
| 8 | − | − | + | − | + |
| 9 | − | − | − | + | + |

A (+) sign indicates the operation of the contacts corresponding to a code unit and a (−) sign indicates that the contacts are not operated.

When data is introduced into a register, the arrangement shown in the attached drawings provides for the restoration of a register element when the corresponding common code magnet is operated in accordance with the (+) sign of the table. This is required with the arrangement shown in the drawings because the normal position of a register element permits the operation of the corresponding common contact set when the detecting or read-out operation takes place. It is to be understood that the invention is not limited to this particular method of operation but applies equally well to an alternate method whereby a register element is displaced when the corresponding common code magnet is operated in accordance with the (+) sign of the table. With either arrangement register elements are displaced or not displaced to obtain the checking facilities desired.

DETAILED DESCRIPTION

*Mechanical operation*

Figure 1A:
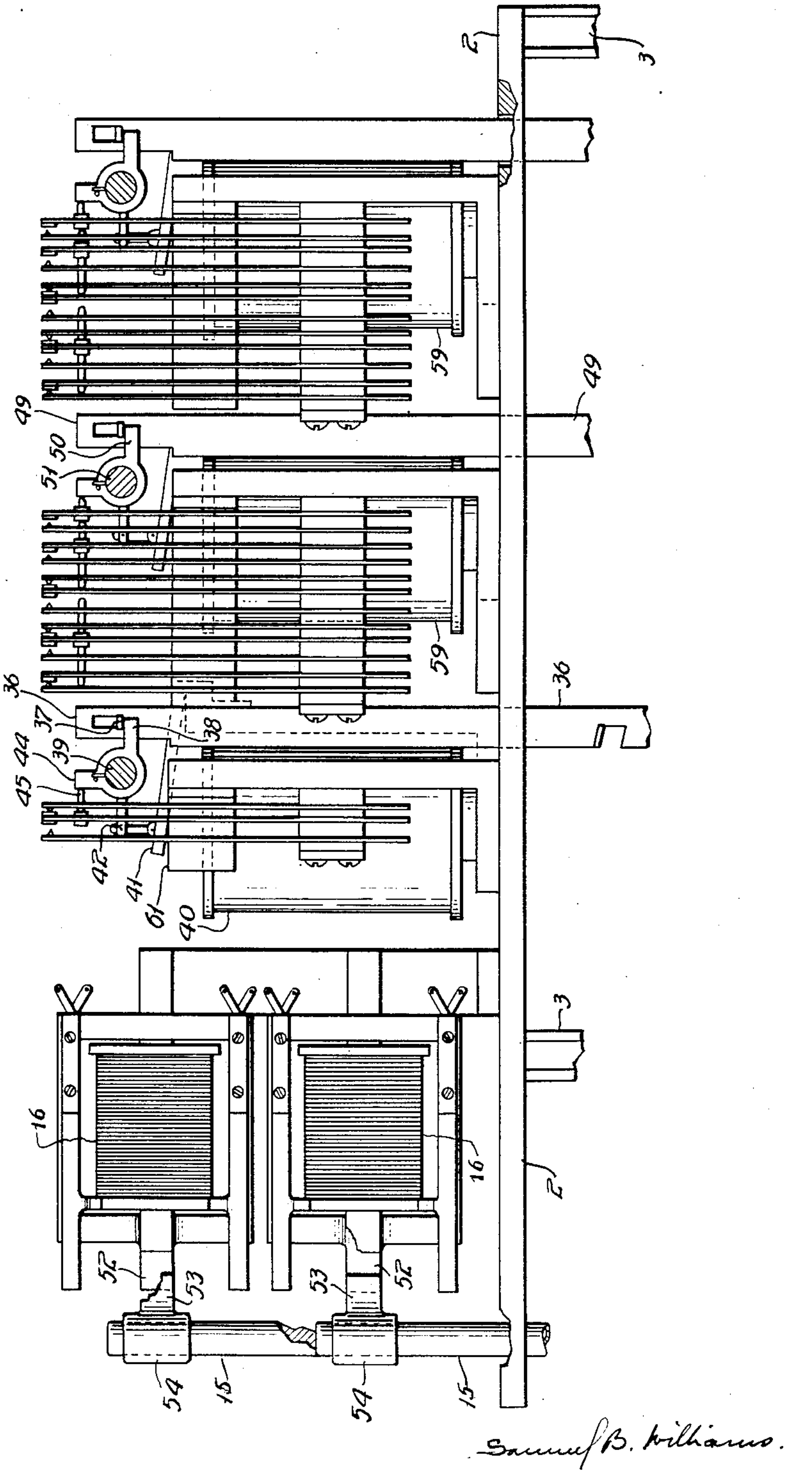
Figure 1B:
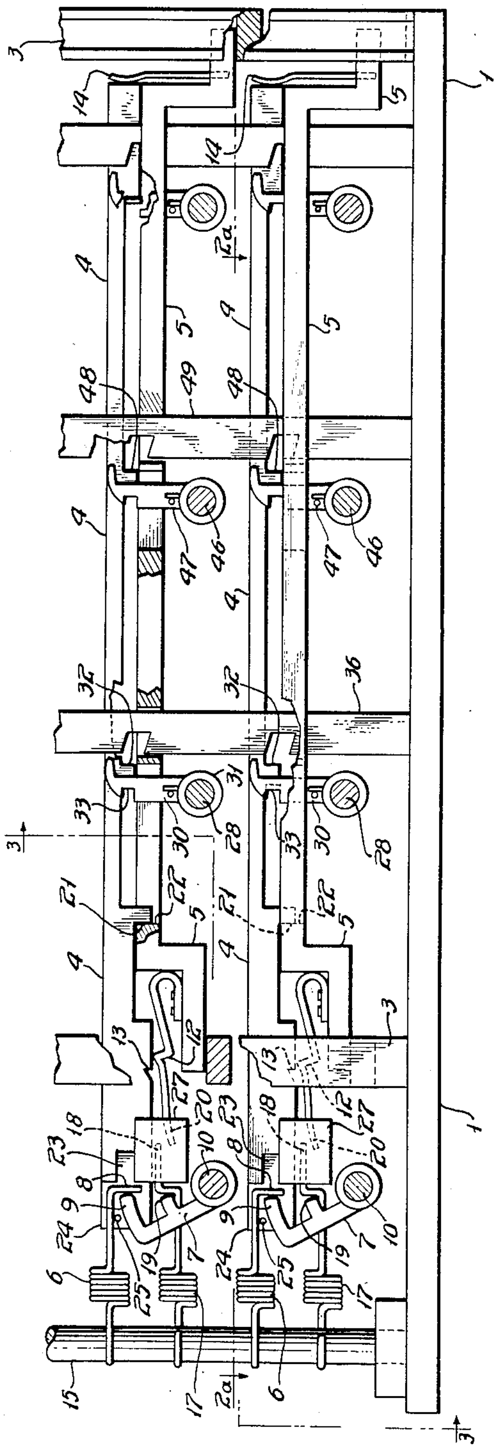

Figs. 1*a*, 1*b*, 2*a*, 2*b* and 3 show a storage mechanism equipped with two registers, each register showing but three storage elements or storage devices and the common control mechanism for introducing and withdrawing the data. The framework of the mechanism consists of a base 1 and a top plate 2 fastened together by channel supports 3. A register element consists of a slidable bar 4 mounted on a register base 5. A register base 5 carries all the register elements 4 for one register and is mounted on the channel supports 3. A register element 4 is moved by the coordinate action of an associated spring member 6 and cam 7 (see also Fig. 6a). When a register element 4 is to be moved, the end 8 of the spring member 6 is placed in the path of tip 9 of the cam 7. Cam 7 is fastened to register shaft 10, controlled by magnet 11, and presses its tip 9 against spring end 8 to move register element 4 far enough to permit latch 12 to engage notch 13 in the bar and thus prevent the register element 4 from returning under action of spring 14 (Fig. 1b). The coiled spring 6 permits the movement of spring end 8. There is one cam 7 for each register element 4, rigidly fastened to the register shaft 10.

Figures 6A, 6B, 6C:
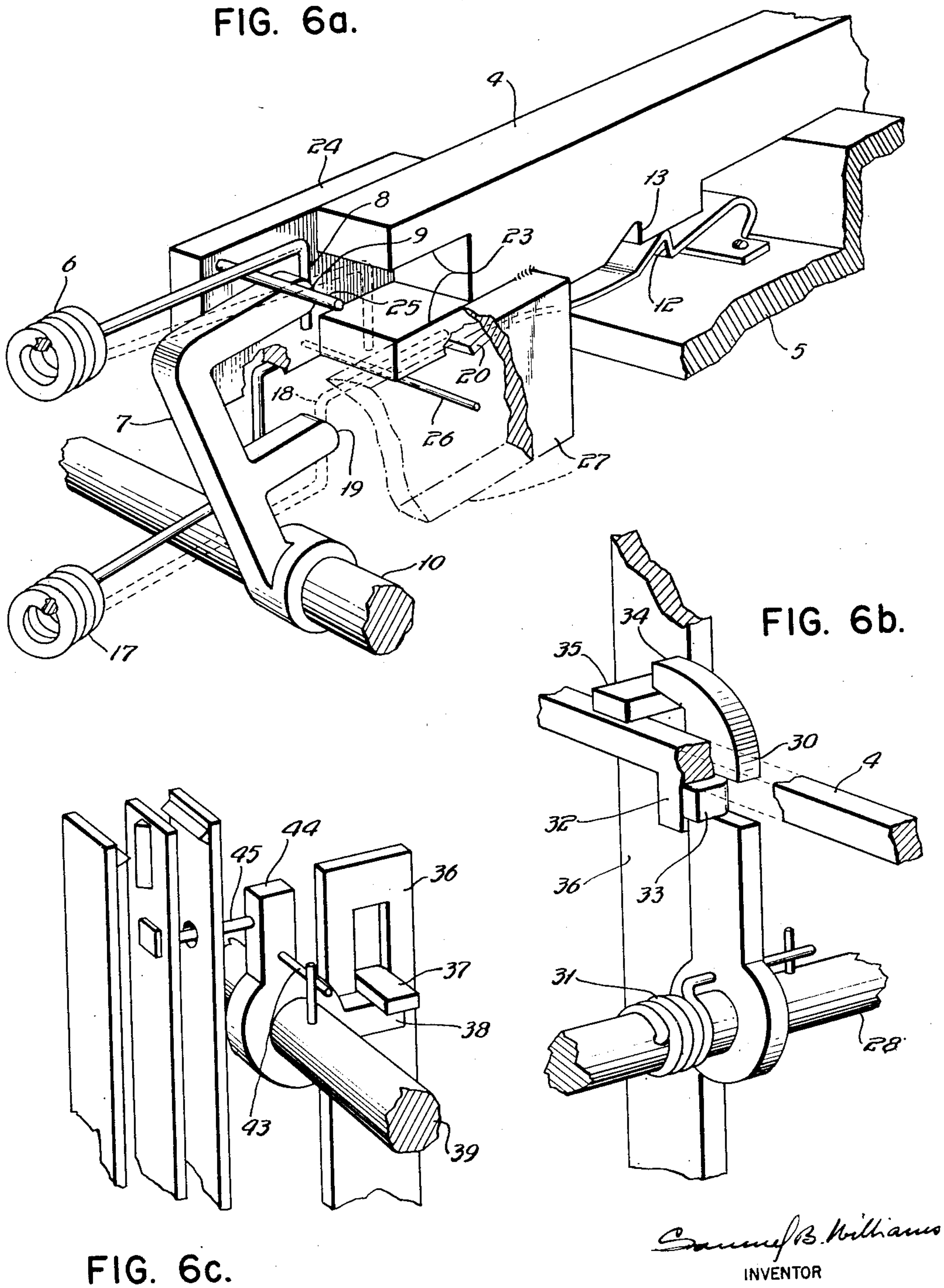

When a code shaft 15 is rotated by a code magnet 16 and a register shaft 10 is rotated by a register magnet 11, the corresponding register element 4 will not be displaced, and, if it is already in its displaced position at that time, it will be restored by action of the spring member 17. The end 18 of this member 17 is moved in the path of tip 19 of cam 7. When register shaft 10 is rotated by register magnet 11 and a cam 7 presses its tip 19 against spring end 18, the spring end moves between the slanting end 20 of latch 12, and the bottom face of register element 4, thus forcing the latch from the notch 13 and permitting the register element 4 to be moved by spring 14 to its normal position as determined by lug 21 of the register element 4 resting against edge 22 of a slot in the register base 5. As shown in Fig. 6a, when spring end 8 is moved out of the path of tip 9, the tip can move into slot 23 in the end of register element 4 without displacing the register element 4 when register shaft 10 is rotated.

There is one code shaft 15 for the corresponding register element 4 of each register, by means of which a register element 4 of any of the registers may be controlled when a register shaft 10 controlled by a register magnet 11 is rotated. Thus when the code magnets 16 are in their operated or released conditions in accordance with coded data, the registration of the data in a given register is obtained by the operation of register magnet 11 which rotates register shaft 10 associated with a given register. Register shaft 10 operates the cams 7, and the associated register elements 4 are displaced or released depending on the position of the corresponding springs 6 and 17 controlled through code shafts 15 by code magnets 16.

Thus, the position of the springs 6 and 17 determines whether or not the register element 4 is to be displaced when the cam 7 is operated. The coils of the springs 6 and 17 permit the movement of the spring ends whenever the cam presses against them.

When a register element 4 is to be displaced, the corresponding code shaft 15 is not rotated, and the end 8, of spring 6 prevents the tip 9 of cam 7, when rotated by a register shaft 10, from entering slot 23 of the register element 4. The operation of the register shaft 10 therefore causes the register element 4 to be moved because cam tip 9 presses spring tip 8 against the end of register element 4 and moves with the element because of coiled spring 6. At this time cam tip 19 does not engage spring tip 18 and the end 20 of latch spring 12 is not affected. When a register element 4 is displaced, latch 12 engages notch 13 and holds the register element in its displaced position.

When code shaft 15 is rotated, spring tip 18 is moved into position to be engaged by cam tip 19 on the cam 7 and is pressed against latch spring 20 by the cam tip 19 upon rotation of register shaft 10, causing the latch 12 to disengage from notch 13 should the register element 4 have been previously displaced. This permits spring 14 at the far end of the register element to return the element to its normal position when the cam 7 is operated by register shaft 10. At this time spring tip 8 has been moved out of the path of cam tip 9 which enters slot 23 of the register element 4 and thus does not move the element or prevent it from restoring.

Figure 2A:
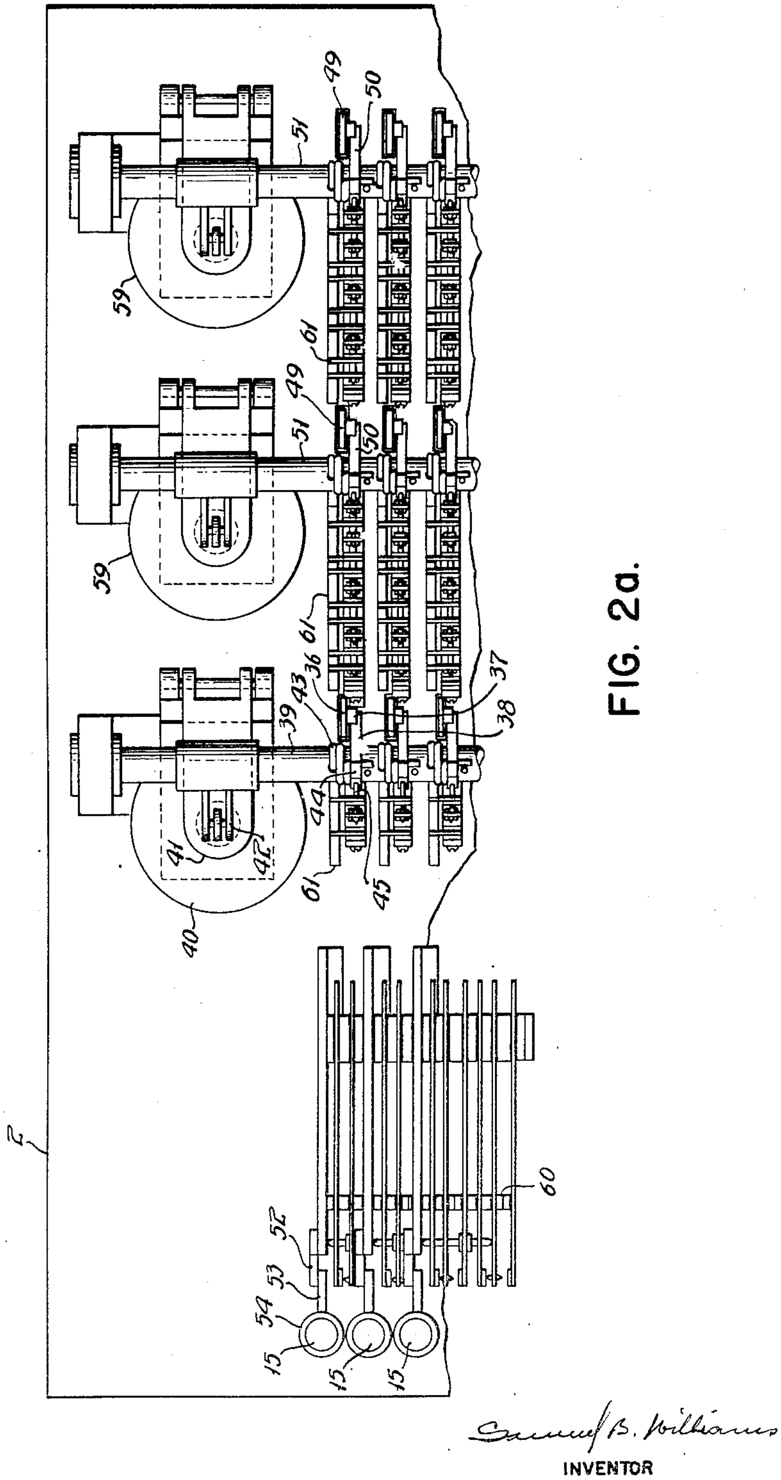
Figure 2B:
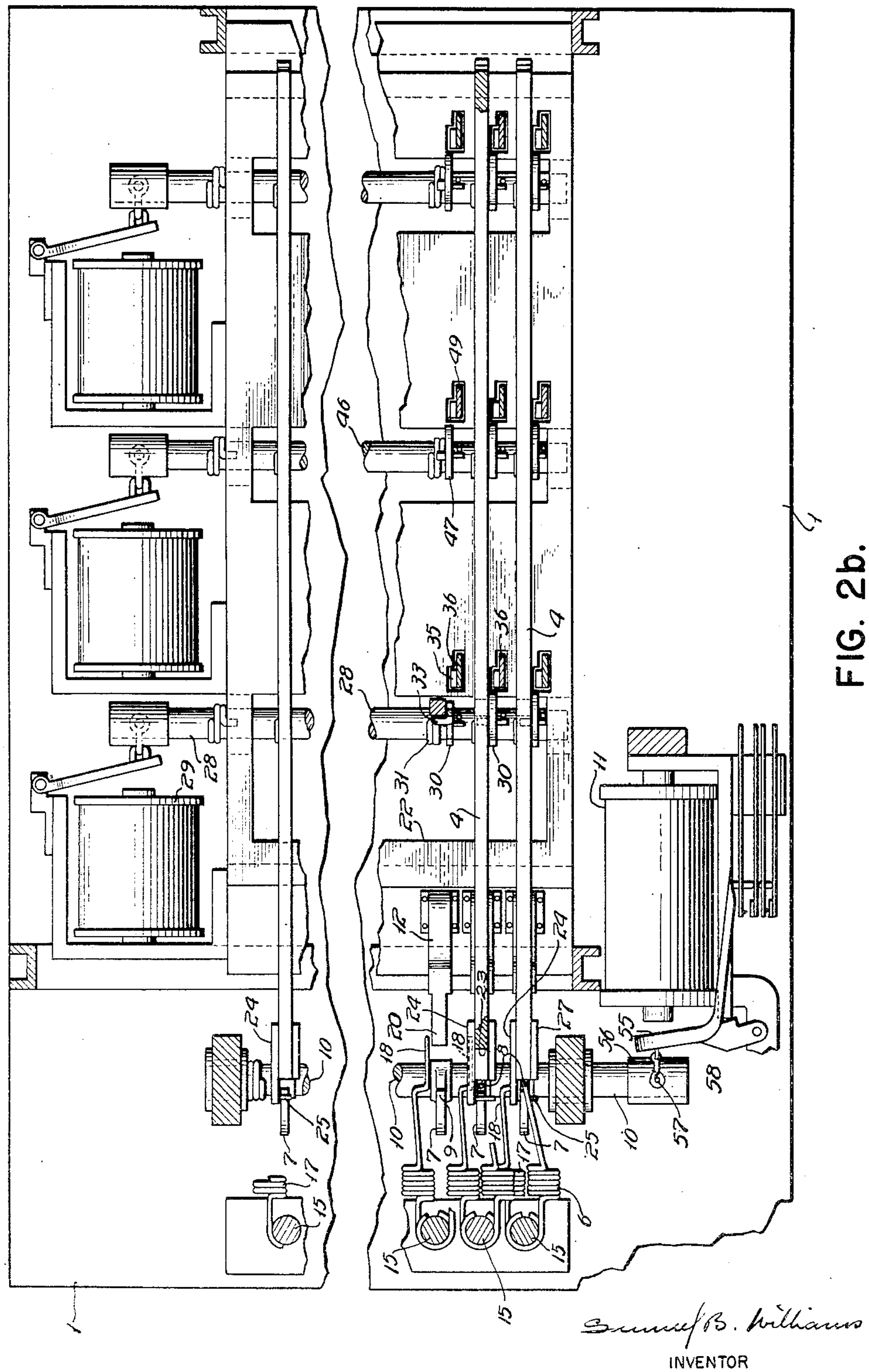

As shown in Figs. 2b and 6a spring end 8 is normally resting against stop plate 24 of register element 4 and is supported by support 25 so that it cannot interfere with the movement of cam 7. Spring end 18 is formed to prevent interference with cam 7 and is supported by support 26. When operated, spring end 18 is stopped by stop plate 27 of register element 4.

Thus, by this coordinate action of the code shafts 15, one for each set of corresponding register elements and a register shaft 10 associated with the particular register, the desired data can be introduced into a register and maintained in storage until changed by the introduction of other data.

Referring to the five unit code table previously described, a code magnet operates for a (+) sign and remains normal for a (−) sign while a register element is displaced to represent a (−) sign and is not displaced or is restored to represent a (+) sign when the code magnets are operated and a register magnet is operated in this embodiment of the invention.

In order to determine positively that the register elements 4 have been displaced in accordance with the coded data and that they remain in such displaced positions after register shaft 10 is returned to normal, a register check shaft 28 is rotated by a register check magnet 29, as shown in Fig. 2b. This check carries cams 30, and for each register element 4, which are moved by the coiled spring 31 when the check shaft rotates. As shown in Figs. 2b and 6b, register element 4 is in its normal position. When check shaft 28 is rotated, spring 31 permits the check shaft 28 to rotate without moving cam 30. When a register element 4 is displaced, as above described, and held in such displaced position by latch 12, the lug 32 on the register element 4 is in such position that cam 30 can be moved by spring 31 because lug 33 is not prevented from moving.

Referring to Figs. 1a and 6b, it will be noted that the tip 34 of cam 30 is adapted to engage a detent 35 of a strap 36. Strap 36 carries detents 35, one for each corresponding cam 30. A detent 37 at the upper end of strap 36 is engaged by cam 38 carried by the common check shaft 39. When this check shaft 39 is rotated by the operation of armature 41 of check magnet 40 through link 42, cam 38 will rotate with check shaft 39, provided strap 36 is free to move. However, if a cam 30 is permitted to move its tip 34 into engagement with a detent 35 because a register element 4 has been displaced and moved lug 32 away from lug 33 of cam 30, strap 36 is prevented from being lifted by cam 38. As shown in Figs. 2a and 6c, cam 38 is connected to check shaft 39 by coiled spring 43 and rotates with check shaft 39, provided strap 36 is not engaged by cam 30.

As shown in Fig. 1*a*, cam 38 carries an arm 44 adapted to press against the insulating stud 45 and operate contact springs which, as will be described later, provide for checking the cooperation of code shafts 15 and register shaft 10 to displace the register elements 4 and to insure that a register element is held in such displaced position by the latch 12.

Figs. 1*a*, 1*b*, 2*a*, 2*b*, 4*a*, and 4*b* show two read-out channels. Each read-out channel comprises a register read-out shaft 46 per register which carries a spring controlled cam 47 for each register element 4. The register element 4 is provided with a stop 48 which prevents cam 47 from engaging the strap 49 when the register element is not displaced. When register element 4 is displaced, cam 47 engages strap 49 and prevents the operation of cam 50 on read-out shaft 51 of the common equipment. This operation is the same as that described for the checking channel. The second read-out channel operates in the same manner.

As will be shown later data may be recorded in one register while at the same time data can be read out from some other register in the same mechanism and, as will be shown, data can be transferred from one register to a different register in the same mechanism.

Fig. 2*a* shows a top view of the mechanism and in Fig. 2*b* the top plate is removed. Parts of the register element are removed to illustrate more clearly the cam operations. When a code magnet 16 (Figs. 1*a* and 4*a*) is operated the armature end 52 presses against the tip 53 of collar 54 fastened rigidly to the code shaft 15 and rotates the shaft. This moves the springs 6 and 17. Spring end 8 is moved out of the path of tip 9 and spring end 18 is moved into the path of tip 19 of cam 7, which is rigidly fastened to register shaft 10. When register magnet 11 is energized, armature 55 (Figs. 2*b* and 3) rotates register shaft 10 through the collar 56, pin 57 and link 58. The operation of magnets 16 and 11 operates contact springs to control circuits as shown in Fig. 5.

In Fig. 2*b*, the lowest register element is shown complete, the next register element is cut away to show the normal positions of spring end 8 and slot 22, and the third register element is removed to show the normal position of spring end 18 in its relation to tip 20 of the latch.

These cutaway views also show the control springs 31 of cam 30 and 47. The top plate 2 carries the common check magnet 40 and read-out magnets 59 and shows the linkage of the armature 41 to shaft 39. Cams 38 are controlled through springs 43 by check shaft 39 and operate contact springs to control circuits shown in Fig. 5.

Figure 3:
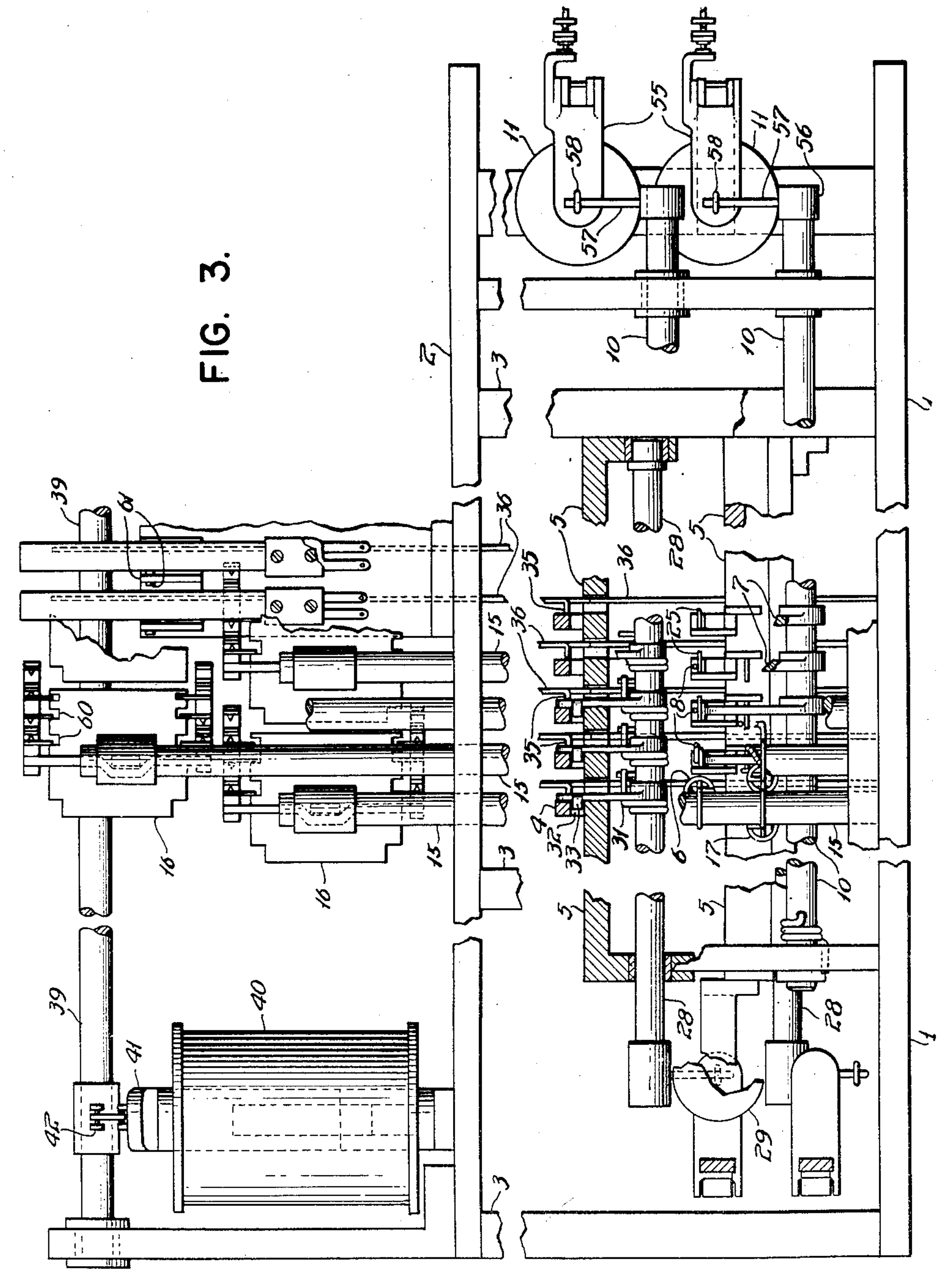

Fig. 3 shows a front view of the mechanism. The front winding heads of code magnets 16 are slotted as shown at 60 to provide stop positions for the contact springs and thus provide for definite contact spring adjustment. A similar slotted card for adjusting the contact springs of the check and read-out contact springs is indicated at 61. Parts in the foreground are cut away to illustrate the various camming operations shown in greater detail in Figs. 6*a* and 6*b*.

Figure 4A:
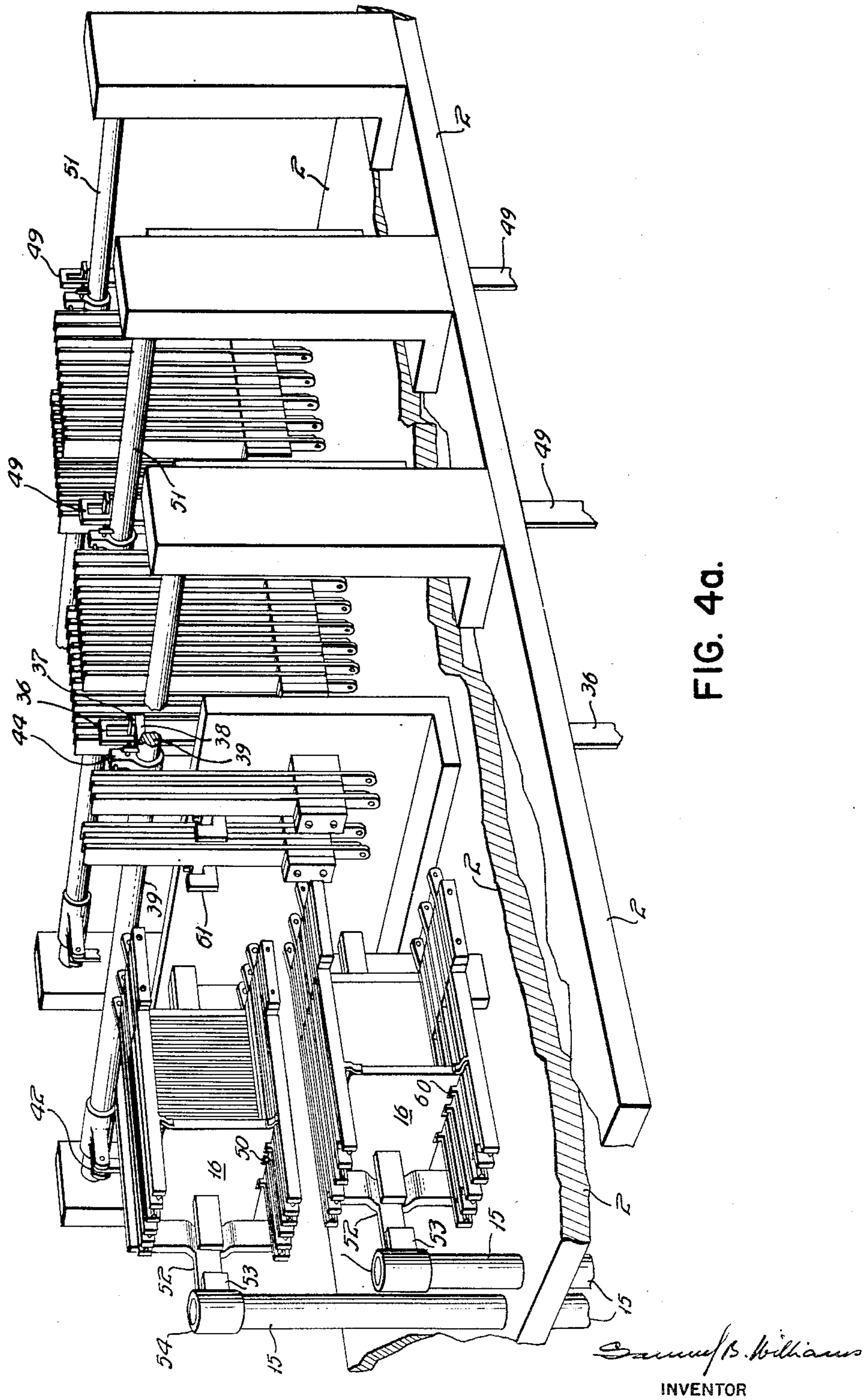
Figure 4B:
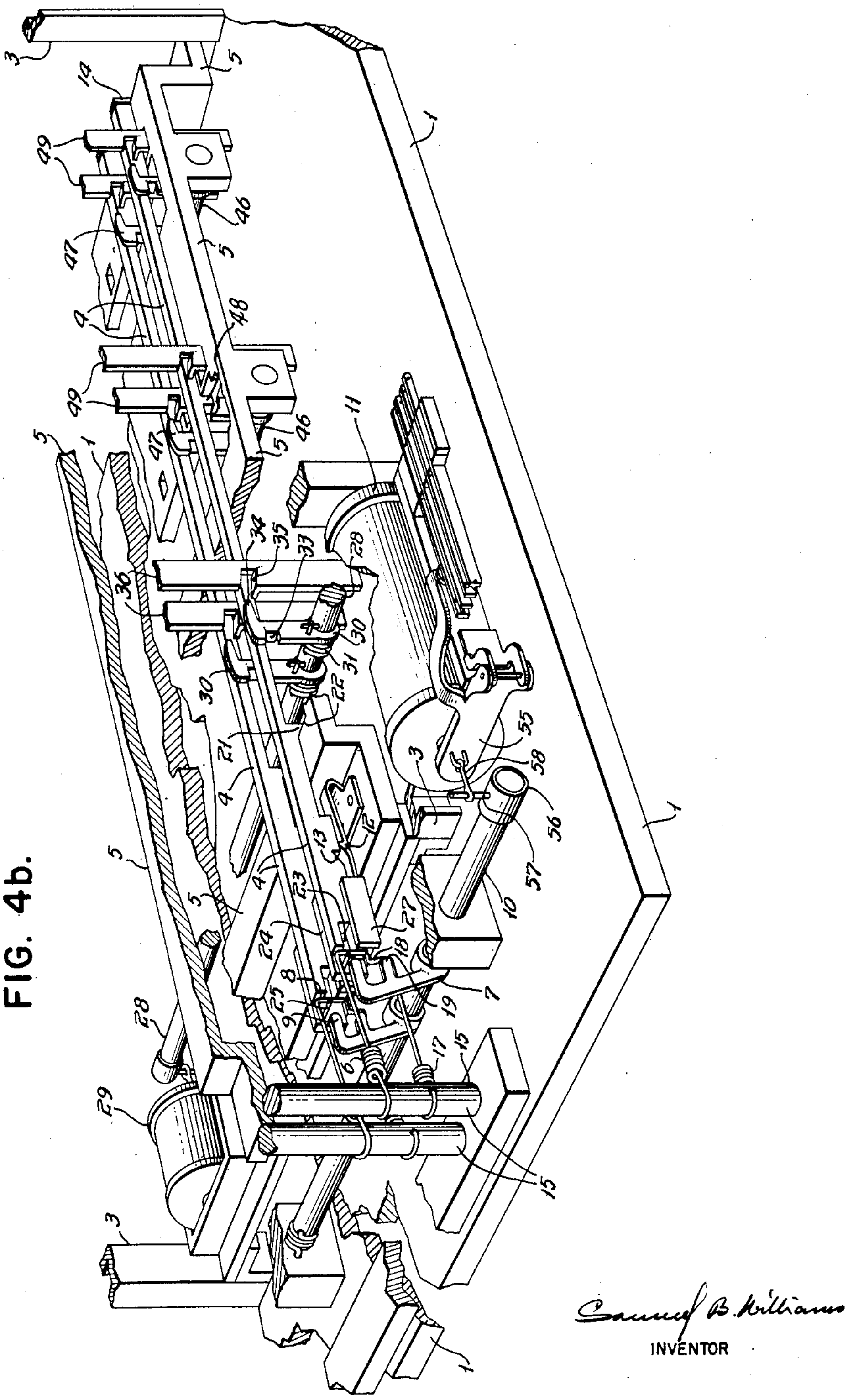

Figs. 4*a* and 4*b* show a perspective view of two register elements of one register and the common equipment mounted on the top plate 2. A part of register base 5 and register magnet 11 is cut away to show the action of cam 30 and strap 36.

The drawings show one magnet for rotating a shaft. When the shaft is long or the work done by the shaft requires an amount of power that cannot be readily supplied by a single magnet the entire device may be divided into sections of such size as to permit the use of reasonably sized magnets, in which case the magnets may be operated in parallel, without departing from the spirit of my invention. Furthermore, the contact springs such as are operated by the read-out shaft 51 may be reduced to two single springs operated by a cam 50 when the shaft rotates, to operate a relay which operates the contact springs shown and thus reduce the load on magnet 59 which rotates shaft 51. The introduction of such means which may be required in some form of my invention does not depart from the principle thereof because the checking circuits to be described later on can be controlled by the contacts of the relays, thus, in effect, include the relays and their contact springs as part of the camming elements of shaft 51.

*Electrical circuit operation*

Figure 5A:
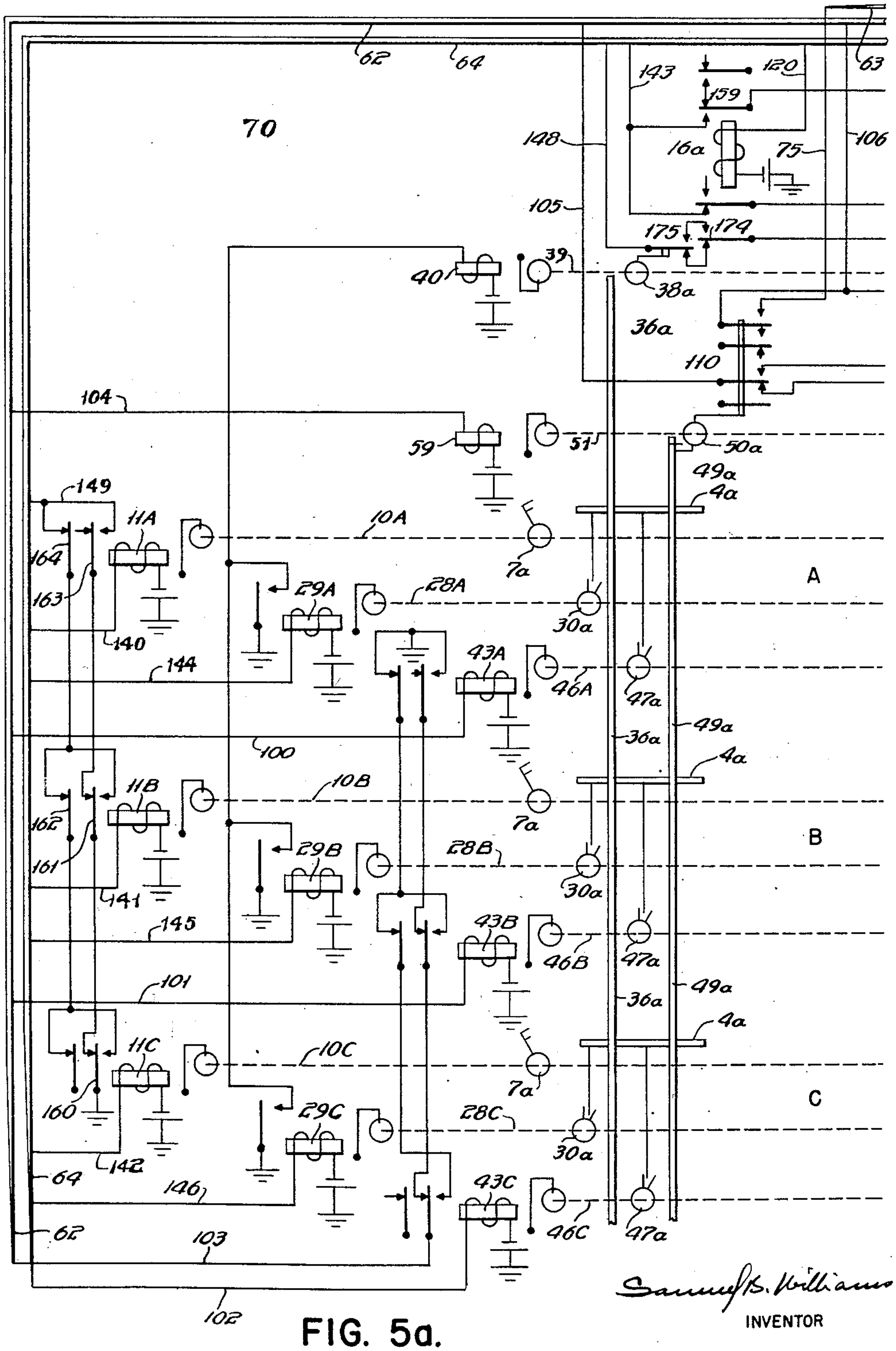
Figure 5B:
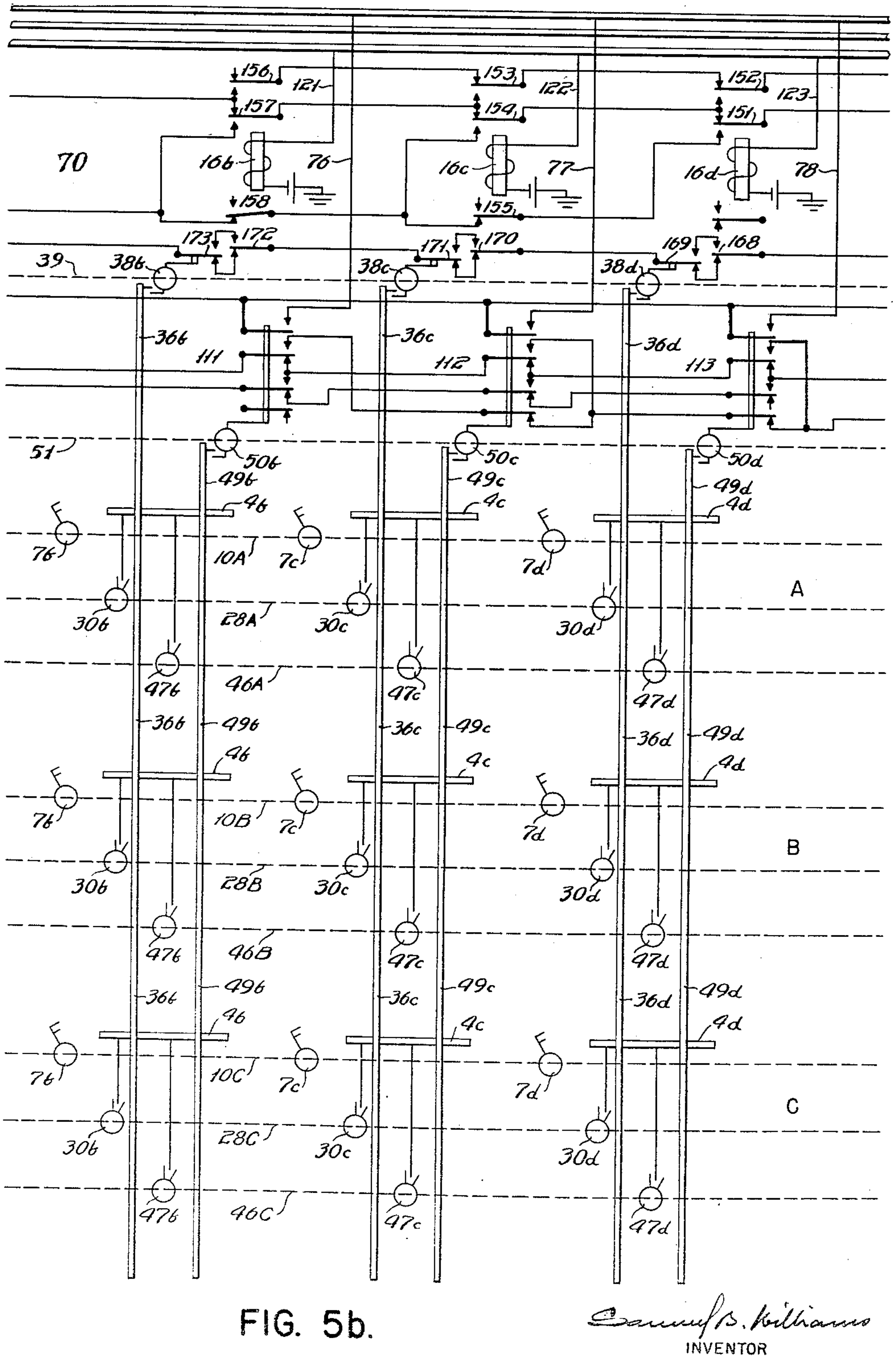
Figure 5C:
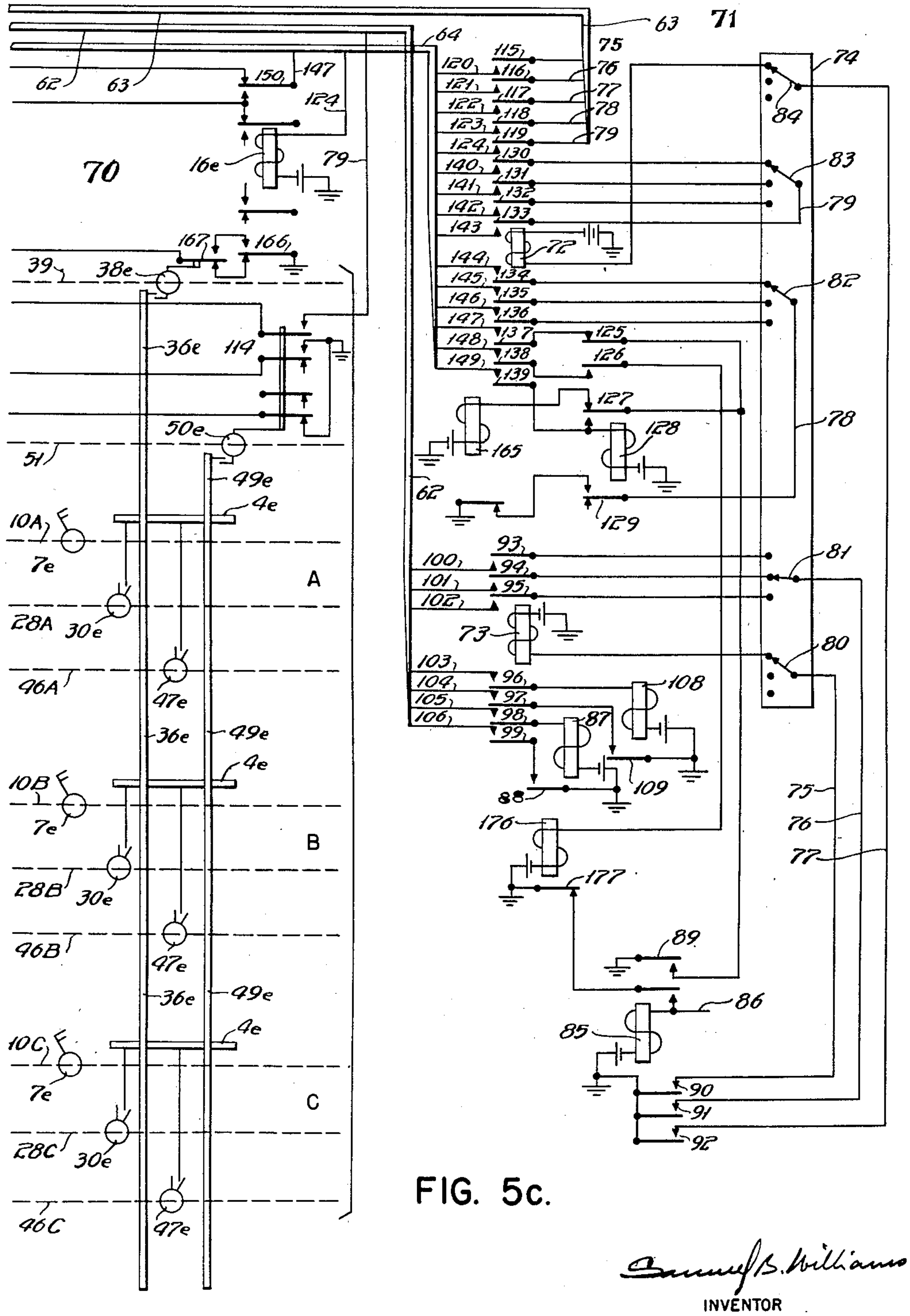

Figs. 5*a*, 5*b*, and 5*c* illustrate a circuit for transferring data such as a number in code from one register to another register in the same mechanism.

The storage mechanism 70 is connected to the control circuit 71 through a read-in relay 72 and a read-out relay 73. Five register elements in each of three registers, A, B, and C are shown as 4*a*, 4*b*, 4*c*, 4*d*, and 4*e*. The shafts, cams, lugs, straps and magnets are designated with the same reference numbers as in Figs. 1*a*, 1*b*, 2*a*, 2*b*, 3, 4*a*, and 4*b*.

The control circuit 71 is not shown in detail but it will be understood that when a number is to be transferred the translator shown in the box 74 is adjusted to connect conductors 75, 76, 77, 78, and 79 through selector switches 80, 81, 82, 83, and 84, respectively, to a register in the storage mechanism from which a number is to be transferred and to a different register in the same storage mechanism, in which the number is to be stored. The drawing shows one mechanism 70 but it is to be understood that the two registers involved may be located on separate mechanisms, and further that the number may be read in from other places, such as a calculator, a keyboard, or a tape control circuit, or that it may be read out to such other places. The part of the following description will apply when the circuit of such other places is arranged to cooperate with the control circuit 71.

The control circuit contains various relays designating the type of operation to be performed by the computing system. One such relay, 85, is shown with its operating conductor 86. This relay would be operated when a number is to be transferred from one register to another. The register, from which the number is to be taken, will be determined by the setting of switches 80 and 81, and the register in which the number is to be stored, by the setting of switches 82, 83, and 84. The method of setting these switches in no way affects the operations about to be described as they only designate or select the particular mechanism and registers involved in the transfer.

The mechanism 70 shows the equipment required for storing one digit of a number in three registers, A, B, and C, when the value of the digit is represented in the five unit code previously described. It will be understood that each of the other digits of a number will require five register elements, 4, and five cams 7, 30, and 47 per register together with five common code magnets 16, straps 36, and 49, and cams 38 and 47, and that shafts 39, 51, 10, 28, and 46 are lengthened accordingly. The circuits through conductors 143, and 105 will be extended in serial relation through the five contact sets of each digit group to provide for the check operations as will be described.

It will be assumed for the purpose of this description that switches 80 and 84 both select mechanism 70. Switch 81 selects register B, from which the number 2 represented by code units *a* and *d*, is to be taken and switches 82 and 83 select register A, in which the number 2 is to be stored. In other words, the number 2 will be read out of register B and read into register A of the storage device 70. Register elements 4*a* and 4*d* are normal, and register elements 4*b*, 4*c*, and 4*d* are assumed to have been previously displaced in register B, thus registering the number 2, and after the transfer, register elements 4*a* and 4*d* will be normal and 4*b*, 4*c*, and 4*e* will be displaced in register A to store the number 2.

The operation of relay 85 connects ground at contact 90 over conductor 75 through switch 80 to the winding of relay 73. Ground is also connected at contact 92 over conductor 77 through switch 84 to operate relay 72. Relay 73 closes the circuits for read-out and relay 72 closes the circuits for read-in. Ground at contact 91 over conductor 76, switch 81, contact 96, conductor 101 of cable 62 operates read-out magnet 43B of register B. As previously described, magnet 43B rotates shaft 46B to place cams 47*a* to 47*e* associated with register elements 4*a* to 4*e* of register B in operative relation to the straps 49*a* to 49*e* to prevent any operation of those straps associated with displaced register elements 4*b*, 4*c*, and 4*e* of register B held in their displaced positions by their respective latches 12, as previously described for Fig. 1.

The contacts of magnet 43B close the check circuit which is connected in series through contacts of read-out magnets 43A and 43C of registers A and C respectively. This circuit is closed when one and only one of the magnets 43A, 43B, and 43C is operated and connects ground over conductor 103 of cable 62 contact 98 of relay 73 to operate relay 108. Contact 109 connects ground through contact 97, conductor 104 of cable 62, to operate common read-out magnet 59. As previously described in connection with Fig. 1*a*, magnet 59, rotates shaft 51, which carries a cam 50 for each strap 49. The cams 50*a* and 50*d* corresponding to straps 49*a* and 49*d*, operate their corresponding contact sets 110 and 113. Since register elements 4*a* and 4*d* of register B are in their normal positions, associated cams 47*a* and 47*d* cannot block the movement of straps 49*a* and 49*d*. This permits cams 50*a* and 50*d* to rotate with shaft 51 and operate contact sets 110 and 113.

The operation of contact sets 110 and 113 close a check circuit from ground at set 114 to conductor 105 of cable 62, and contact 98 to operate relay 87 when any two and exactly two of the sets are operated. Ground through contacts 88 and 99, conductor 106 of cable 62, is connected to the top contacts of the spring sets 110 and 114. At set 110, this ground is extended over conductor 75 of cable 63, contact 115, conductor 120 of cable 64 to operate code magnet 16*a*. At set 113, this ground is extended over conductor 78 of cable 63, contact 118, conductor 123 of cable 64 to operate code magnet 16*d*.

The operation of these code magnets completes circuit from ground, contacts 89, 125, and 137, conductor 147 of cable 64, back contact 150, front contact 152, back contacts 154 and 157, front contact 159, conductor 143 of cable 64, contact 133, conductor 79, switch 82, contact 130, conductor 140 of cable 64, to operate register magnet 11A of register A.

The circuit through contacts 151 to 159 inclusive of code magnets 16*a* to 16*e*, is closed when any two and exactly two of the magnets are operated. If either magnet 16*a* or 16*d* fails to operate their contact springs, the circuit is open at contacts 159 or 152, respectively. If any of the magnets 16*b*, 16*c* or 16*e* operate in error, the circuit is open at contacts 157, 154 or 150, respectively.

As previously described in connection with Figs. 1*a*, 2*a*, and 4*a*, the operation of code magnets 16*a* and 16*d* rotate their respective code shafts 15 to position the ends 8 of their spring members 6 and the ends 18 of the spring members 17 so that cams 7 on register shaft 10A of register A will cause their associated register elements 4*a* and 4*b* to assume their non-displaced position when register magnet 11A operates. In the operation being described, register elements 4*b*, 4*c*, and 4*e* are displaced when register magnet 11A operates, because code magnets 16*a*, 16*b* and 16*c* have not operated.

A circuit is now closed by the operation of magnet 11A from ground, back contacts 160 and 161, front contact 163, conductor 149 of cable 64, contact 139, to operate relay 128. This circuit closes when one and only one of the magnets 11A, 11B or 11C operates. The operation of relay 128 opens the previously described operating circuit of magnet 11A at contact 125. Relay 165, which operated from ground at contact 89 when relay 85 operated, is released at back contact 127, and relay 128 is locked in its operated position over operated contact 127 and contact 89. Relay 165 is a slow to release relay to provide time for magnet 11A of register A to release and for any of the register elements 5 that have been displaced to restore if, for any reason, they fail to be held in their displaced position by their latches 12.

The release of relay 165 connects ground through contact 129, conductor 78, switch 82, contact 134, conductor 144 of cable 64 to operate magnet 29A of register A.

As previously described, check shaft 28A rotates cams 38 corresponding to those register elements 4 which have not been displaced in register A. In this description elements 4*a* and 4*d* have not been displaced and cams 39*a* and 39*d* do not rotate while cams 39*b*, 39*c*, and 39*e* do. Thus, as previously described for Figs. 1*a* and 1*b*, straps 36*b*, 36*c*, and 36*e* are prevented from moving while straps 36*a* and 36*d* may be moved when magnet 40 operates.

The operation of magnet 29A operates magnet 40 in an obvious circuit. When check shaft 39 operates, cams 33*a* and 33*d* raise straps 36*a* and 36*d* and operate contact springs 175 and 169. A circuit is now closed from ground, back contacts 166 and 167, front contacts 168 and 169, back contacts 170, 171, 172 and 173, front contacts 174 and 175, conductor 148 of cable 64, contacts 138 and 126 to operate relay 176. This is the check to insure that register elements 4a and 4d are in their normal positions and register elements 4b, 4c and 4d are displaced to record the number 2 in register A. The operation of relay 176 opens the locking ground for relay 85 at contact 177. The release of relay 85 removes ground from the control circuit and release relays 128, 72, 73, 128 the operated code magnet 16a, 16d and 40 and magnet 29A of register A.

It is obvious that if the device 70 is equipped with 60 register elements, a 12 digit number can be stored when the contacts of the five common code magnets 16 for each digit and the corresponding contact sets such as 110 to 114, corresponding to five register elements, are connected as shown in Fig. 5, and these groups are connected serially over conductors 105, 143, and 140 to the control circuit 71. The number of registers with which any such mechanism such as 70 may be equipped, may vary, the checking circuits through the contacts of magnets 11B and 43B being extended through the contacts of the additional register magnets 11 and 43 in the same manner as shown in Fig. 5.

Likewise, it is obvious that if the mechanism 70 is equipped with 60 register elements, the wiring of the check circuits can be adapted for a six unit code instead of the five unit code shown, without modifying the sequence of operation previously described. In such case the digits of a number or the characters of the stored data may be represented by the operation of three of the six common magnets 16 forming one such digit or character.

Likewise, it is obvious that the mechanism 70 may be equipped for codes having other numbers of units, such as seven, eight, twelve, and the like, provided that each character is represented by the operation of the same number of magnets 16 in a given code and that the check circuits are arranged to check for such operation.

When the common contacts located on relays, which are operated by single make contacts controlled by the shafts as previously mentioned, to reduce the load on the magnets, the above described check circuits controlled by the relay contacts provide an overall check not only of the mechanical operation but the relay operation as well.

While I have described above the principles of my invention in connection with specific apparatus, it is to be clearly understood that this description is made only by way of example and not as a limitation to the scope of my invention.

What is claimed is:

1. In a storage register for storing symbols in combinational form, the combination of a plurality of register elements for representing said symbols by different combinations of normal or displaced positions of said elements; control means for said register elements including a member related to each register element and means on each member to control whether or not its related register element is to occupy a normal or displaced position, depending upon the position of the member; symbol-entering means to position the members of the control means selectively from normal position according to the combinations representing the symbols to be stored; operating means cooperating with the means on the members to cause the register elements to be positioned in their normal or displaced positions to store the symbols as controlled by the selective positioning of the members; a read-out device for making available data stored in said register, said read-out device comprising a set of contacts, containing one contact for each register element, a contact-operating means including a shiftable member adjacent each register element and tending to operate the contacts, a mechanism for enabling the register elements to control the operation of the shiftable members, said mechanism including latches controlled by the position of the register elements to block the shiftable members against movement when the register elements are in one position and to allow the shiftable members to move and operate their contacts when the register elements are in another position, means to operate the mechanism to cause a read-out operation to take place, and means rendered operable by the operation of the mechanism to cause the contact-operating means to operate, said contacts by their operated and unoperated conditions making available the symbols stored on the register elements.

2. In a storage register for storing symbols in combinational form, the combination of a plurality of register elements for representing said symbols by different combinations of normal or displaced positions of said elements; control means for said register elements including a member related to each register element and means on each member to control whether or not its related register element is to occupy a normal or displaced position, depending upon the position of the member; symbol-entering means to position the members of the control means selectively from normal position according to the combinations representing the symbols to be stored; operating means cooperating with the means on the members to cause the register elements to be positioned in their normal or displaced positions to store the symbols as controlled by the selective positioning of the members; a checking device for checking the position of the register elements against the operation of the symbol-entering means to insure that the storage devices are positioned properly, said checking device comprising a set of contacts, one related to each member in the control means, and operated when the related member is operated, a second set of contacts, containing one contact for each register element, a contact-operating means including a shiftable member adjacent each register element and tending to operate the contacts, a mechanism for enabling the register elements to control the operation of the shiftable members, said mechanism including means controlled by the position of the register elements to block the shiftable members against movement when the register elements are in one position and to allow the shiftable members to move and operate their contacts when the register elements are in another position, means to operate the mechanism to cause a checking operation to take place, means rendered operable by the operation of the mechanism to cause the contact-operating means to operate, and a circuit interconnecting the two sets of contacts, which circuit is completed when the register elements have been displaced properly according to the requirements of the symbol-entering means.

3. In a storage register for storing symbols in combinational form, the combination of a plurality of register elements for representing said symbols by different combinations of normal or displaced positions of said elements; control means for said register elements including a member for each register element and means on each member to control whether or not its related register element is to occupy a normal position or a displaced position, depending upon the position of the member; symbol-entering means to position the members of the control means selectively from normal position according to the combinations representing the symbols to be stored; contacts settable to open or closed positions by the positioning means according to the symbols to be stored; operating means cooperating with the means on the members to cause the register elements to be positioned in their normal or displaced positions to store the symbols; checking means including contacts controlled as to their open or closed position by the position of the register elements; means operated by the operating means to render the checking means effective to close or open the checking contacts according to the positions of the register elements; and means including a circuit controlled jointly by the contacts settable by the positioning means and by the contacts settable by the checking means to indicate whether or not the register elements have been positioned correctly to store the symbols.

4. The storage register as claimed in claim 3 in which the contacts settable by the positioning means include a contact for each of the members and in which a contact closer in the positioning means closes a contact when the positioning means moves the member related to that contact, from its normal position.

5. The storage register as claimed in claim 4 in which a contact is provided in the checking means for each register element and in which means on the register element prevents the closing of the related contact if the element is in its displaced position.

6. The storage register as claimed in claim 3 in which the circuit controlled jointly by the contacts settable by the positioning means and by the contacts settable by the checking means will be closed only when the member related to a register element has been moved from its normal position and the corresponding register element is in its normal position.

7. In a storage mechanism for storing symbols in combinational form represented by the various combinations of normal or displaced positions of a plurality of register elements of a set, the combination of a plurality of registers, each register including a set of register elements for each of the symbols that may be stored therein at one time, and each of said register elements being settable in a normal position or a displaced position; a plurality of selectively operable selector members common to the plurality of registers, one selector member being provided for each register element of a register and having means thereon cooperating with the corresponding register elements in the several registers to control the position to be occupied by the register elements; symbol entering means to operate selected ones of the selector members according to the symbols to be stored to cause the selector members to control their related register elements; and register selecting means for selecting in which register the symbols are to be stored, said selecting means including an individually operable operating means for each register, cooperable with and operable through the selector member carried means for that register to cause the register elements of that register to be positioned according to the control exerted by the selector members.

8. In a storage mechanism for storing symbols in combinational form represented by the various combinations of normal or displaced positions of a plurality of register elements of a set, the combination of a plurality of registers, each register including a set of register elements for each of the symbols that may be stored therein at one time, and each of said register elements being settable in a normal position or a displaced position; a plurality of selectively operable selector members common to the plurality of registers, one selector member being provided for each register element of a register and having means thereon cooperating with the corresponding register elements in the several registers to control the position to be occupied by the register elements; symbol-entering means to operate selected ones of the selector members according to the symbols to be stored to cause the selector members to control their related register elements; register selecting means for selecting in which register the symbols are to be stored, said selecting means including an individually-operable operating means for each register, cooperable with the selector-member-carried means for that register to cause the register elements of that register to be positioned according to the control exerted by the selector members; a common read-out device for the plurality of registers in the storage mechanism, said read-out device including a plurality of contacts, one contact being related to a corresponding register element in each of the registers and being operable to indicate by its closed or open condition the normal or displaced position of an element, and means selectively operable to enable the register elements of any selected register to control the positioning of the contacts, the combinations of closed and open positions of the contacts providing combinational representations of the symbols stored in the selected register and may be used to control some other apparatus.

9. In a storage mechanism for storing symbols in combinational form represented by the various combinations of normal or displaced positions of a plurality of register elements of a set, the combination of a plurality of registers, each register including a set of register elements for each of the symbols that may be stored therein at one time, and each of said register elements being settable in a normal position or a displaced position; a plurality of selectively operable selector members common to the plurality of registers, one selector member being provided for each register element of a register and having means thereon cooperating with the corresponding register elements in the several registers to control the position to be occupied by the register elements; symbol-entering means to operate selected ones of the selector members according to the symbols to be stored to cause the selector members to control their related register elements; register selecting means for selecting in which register the symbols are to be stored, said selecting means including an individually-operable operating means for each register, cooperable with the selector-member-carried means for that register to cause the register elements of that register to be positioned according to the control exerted by the selector members; a read-out device for making available data stored in any one of said plurality of registers, said read-out device comprising a set of contacts, one contact for each register element in a register, a contact-operating mechanism including a shiftable member adjacent to similar register elements of the plurality of registers and tending to allow the mechanism to operate the contacts, an individually operable read-out control mechanism for each register for enabling the register elements to control the operation of the shiftable members, each individually operable read-out control mechanism including means controlled by the position of the register elements of that register to block the shiftable members against movement if the register elements of the selected register are in one position and allow the shiftable members to move and operate their contacts if the register elements of the selected register are in their other position, the condition of the contacts thereby making available the symbols stored on the register whose individually operable read-out control mechanism is operated.

10. In a storage mechanism for storing symbols in combinational form represented by the various combinations of normal or displaced positions of a plurality of register elements of a set, the combination of a plurality of registers, each register including a set of register elements for each of the symbols that may be stored therein at one time, and each of said register elements being settable in a normal position or a displaced position; a plurality of selectively operable selector members common to the plurality of registers, one selector member being provided for each register element of a register and having means thereon cooperating with the corresponding register elements in the several registers to control the position to be occupied by the register elements; symbol-entering means to operate selected ones of the selector members according to the symbols to be stored to cause the selector members to control their related register elements; register selecting means for selecting in which register the symbols are to be stored, said selecting means including an individually-operable operating means for each register, cooperable with the selector-member-carried means for that register to cause the register elements of that register to be positioned according to the control exerted by the selector members; a checking device for checking the position of the register elements in any one of said plurality of registers against the operation of the symbol entering means to insure that the elements are properly positioned, said checking device comprising a set of contacts, one for each of said selector members, operated by the entering means when the related selector member is operated, a second set of contacts, one for each register element, a contact operating mechanism including a shiftable member adjacent to similar register elements of the plurality of registers and tending to operate the contacts, an individually operable mechanism for each register for rendering the checking device effective to check the position of the register elements in that register by enabling the register elements to control the operation of the shiftable members, each individually operable mechanism including latches controlled by the position of the register elements of that register to latch the shiftable members against movement if the register elements of the selected register are in one position and allow the shiftable members to move and operate their contacts if the register element of the selected register are in their other position, and a circuit interconnecting the two sets of contacts, which circuit is completed when the register elements have been displaced properly according to the requirements of the symbol entering means.

11. In an electro-mechanical mechanism for storing symbols in combinational form represented by the various combinations of normal or displaced positions of register elements of a set, the combination of a plurality of registers, each register including a set of register elements for each of the symbols that may be stored therein at one time and each of said register elements being settable in a normal position or a displaced position; a plurality of selectively operable selector members common to the plurality of registers, one selector member being provided for each register member of a register and having means thereon cooperating with corresponding register elements in the several registers to control the position to be occupied by the registering elements; symbol-entering means including an electromagnet related to each selector member, said electromagnets being selectively energized to operate related ones of the selector members according to the symbols to be stored to cause the selector members to control their related register elements according to the symbols to be stored; and register selecting means for selecting in which register the symbols are to be stored, said selecting means including, for each register, an operating electromagnet and operating means operated thereby and cooperable with the selector member carried means for that register to cause the register elements of that register to be positioned according to the control exerted by the selector members.

12. In a storage register for storing symbols in combinational form represented by the various combinations of normal or displaced positions of a plurality of register elements of a set, each combination requiring a predetermined number of the elements to be in normal position, the combination of a plurality of sets of register elements including a set of register elements for each of the symbols that may be stored therein at one time and each of said register elements being settable in a normal position or a displaced position; a plurality of selectively operable selector members, one selector member being provided for each register element of the register and having means thereon cooperating with corresponding register elements to control the position to be occupied by the register elements; symbol entering means to operate selected ones of the selector members according to the symbols to be stored to cause the selector members to control their related register elements, each operated selector member being effective to control its related register element so that the element will be positioned in its normal position; operating means for the register, cooperable with the selector member carried means for the register to cause the register elements of the register to be positioned according to the control exerted by the selector members; contacts related to each of said selector members; means in the symbol entering means for closing the contacts related to the operated selector members; an electromagnet for operating the register operating means; and a circuit for controlling the energization of said electromagnet, said circuit including said contacts and completed only when said predetermined number of selector members of a set have been operated.

13. In an electro-mechanical storage register for storing symbols in combinational form represented by the various combinations of normal or displaced positions of a plurality of register elements of a set, each combination requiring a predetermined number of the elements to be in normal position, the combination of a plurality of sets of register elements including a set of register elements for each of the symbols that may be stored therein at one time and each of said register elements being settable in a normal position or a displaced position; a plurality of selectively operable selector members, one selector member being provided for each register element of a register and having means thereon cooperating with corresponding register elements in the several registers to control the position to be occupied by the register elements; symbol entering means including an electromagnet related to each selector member, said electromagnets being selectively energized to operate related ones of the selector members according to the symbol to be stored to cause the selector members to control their related register elements, each operated selector member being effective to control its related register element so that the element will be positioned in its normal position; operating means for the register, cooperable with the selector member carried means for the register to cause the register elements of the register to be positioned according to the control exerted by the selector members; contacts related to each of said selector members; means in the symbol entering means for closing the contacts related to operated selector members; an electromagnet for operating the register operating means; and a circuit for controlling the energization of said electromagnet, said circuit including said contacts and completed only when said predetermined number of selector members of a set have been operated.

14. The storage register as claimed in claim 13 and, in addition, a second set of contacts related to the selector members and including a contact related to each selector member and operated by the related symbol entering magnet when the related selector member is operated; a set of checking contacts including a contact for each register element; means controlled by the register elements to allow their related contacts to operate when the register element is in normal position; electromagnetic means to operate the checking contact operating means; a circuit for controlling the electromagnetic means which operates the checking contacts, said circuit being closed by the electromagnetic means which operates the register operating means, when the register operating means is operated, for causing the checking contact operating means to be operated; and a circuit including said second set of contacts and said checking contacts and also including means to restore the operated symbol entering electromagnets and the operated register operating means electromagnet to unoperated condition, said circuit being completed by said contacts, if the register elements corresponding to operated selector members are in their normal position, to cause the restoring means to operate.

15. In a storage register for storing symbols in combinational form, the combination of a plurality of register elements for representing symbols by different combinations of normal or displaced position of said elements; means urging the elements to their normal positions; means latching the elements in their displaced position; operating means for said register elements; and control means for controlling the effect of said operating means on said register elements in positioning them according to the symbols to be stored, said control means including a member related to each register element, which members can be selectively operated from a normal position according to the symbols being stored, and each of said members having an interponent thereon which is engaged by the operating means only in the normal position of the member, to displace the related register element if it is in its normal position, each of said members also having thereon a second interponent which is normally ineffective but which, in the operated position of the member, is moved to effective position to be operated by the operating means to operate the latch and release the registering element to allow that element to return to its normal position if it had been latched in its displaced position.

SAMUEL B. WILLIAMS.

REFERENCES CITED

The following references are of record in the file of this patent:

UNITED STATES PATENTS

| Number | Name | Date |
|---|---|---|
| 1,876,293 | Hofgaard | Sept. 6, 1932 |
| 2,025,602 | Maul | Dec. 24, 1935 |
| 2,070,824 | Boutet | Feb. 16, 1937 |
| 2,153,737 | Spencer | Apr. 11, 1939 |
| 2,293,127 | Fishack et al. | Aug. 18, 1942 |
| 2,405,287 | Brand et al. | Aug. 6, 1946 |